(12) United States Patent
You et al.

(10) Patent No.: US 9,182,953 B2
(45) Date of Patent: Nov. 10, 2015

(54) HYBRID DYNAMIC CODE COMPILING DEVICE, METHOD, AND SERVICE SYSTEM THEREOF

(71) Applicant: INSTITUTE FOR INFORMATION INDUSTRY, Taipei (TW)

(72) Inventors: Yi-Ping You, Taichung (TW); Po-Yu Chen, Kaohsiung (TW); Jing-Fung Chen, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 45 days.

(21) Appl. No.: 14/104,056

(22) Filed: Dec. 12, 2013

(65) Prior Publication Data

US 2015/0143348 A1    May 21, 2015

(30) Foreign Application Priority Data

Nov. 20, 2013   (TW) .............................. 102142236 A

(51) Int. Cl.
   *G06F 9/45*   (2006.01)
   *G06F 9/44*   (2006.01)
   *G06F 9/455*  (2006.01)

(52) U.S. Cl.
   CPC .. *G06F 8/37* (2013.01); *G06F 8/41* (2013.01); *G06F 9/45516* (2013.01)

(58) Field of Classification Search
   None
   See application file for complete search history.

(56) References Cited

U.S. PATENT DOCUMENTS

| | | | | |
|---|---|---|---|---|
| 6,339,782 | B1* | 1/2002 | Gerard et al. ...................... | 718/1 |
| 6,367,068 | B1* | 4/2002 | Vaidyanathan ........... | G06F 8/33 717/110 |
| 8,752,035 | B2* | 6/2014 | Fanning ................... | G06F 8/49 717/141 |
| 2004/0158442 | A1* | 8/2004 | Kondo ............. | 703/1 |
| 2009/0328013 | A1* | 12/2009 | Aharoni et al. .............. | 717/140 |
| 2010/0131951 | A1* | 5/2010 | Carteri et al. ................. | 718/100 |
| 2012/0143589 | A1* | 6/2012 | Beale et al. .................... | 703/26 |
| 2013/0031536 | A1* | 1/2013 | De et al. ....................... | 717/146 |
| 2013/0145343 | A1* | 6/2013 | Warren .................... | G06F 8/30 717/101 |

* cited by examiner

*Primary Examiner* — Don Wong
*Assistant Examiner* — Daxin Wu
(74) *Attorney, Agent, or Firm* — Li & Cai Intellectual Property (USA) Office

(57) ABSTRACT

An exemplary embodiment of the present disclosure illustrates a hybrid dynamic code compiling device having a parser, a native code generator, and a dynamic code rewriter, wherein the parser is coupled to the native code generator and the dynamic code rewriter. The parser receives and parses a first dynamic code to divide the first dynamic code into compilable blocks and non-compilable blocks. The native code generator generates a native code according to the compilable blocks. The dynamic code rewriter rewrites the non-compilable blocks to generate a second dynamic code, wherein the second dynamic code has function calls which communicate between the native code and the first dynamic code.

14 Claims, 6 Drawing Sheets

HYBRID DYNAMIC CODE COMPILING DEVICE, METHOD, AND SERVICE SYSTEM THEREOF

BACKGROUND

1. Technical Field

The present disclosure relates to a dynamic code compiling device, in particular, to a hybrid dynamic code compiling device, a hybrid dynamic code compiling method, and a service system thereof.

2. Description of Related Art

Currently, the network and electronic technology develops rapidly, and by using a terminal device, people can easily browse the web page easily to obtain required service and information. The content of the web page can be edited by text markup language, such as hyper text markup language (HTML), so as to show the structured information (such as title, paragraph, and list table).

However, the text markup language is usually used to edit static or non-interactive web page, but hardly used to edit the dynamic or interactive web page. Thus, a dynamic directly compiling program language is provided, such as JavaScript®. JavaScript® is a dynamic, weak prototype, and prototype based language which can support built-in prototype. JavaScript® code can be embedded in the HTML web page, and can be written in a single file which has the auxiliary file name of "js", so as to easily achieve separation of structure and behavior. JavaScript® code can be used to embed the dynamic script in the HTML web page, response the browser event, access the element of the HTML web page, verify data before the data is sent to the server, detect browser information of the guest, or control cookies.

Currently, Mozilla® provides an optimization solution for JavaScript®, the content of a pre-defined file, named as "ASM.js", is compared with the received JavaScript® code, so as to convert the received JavaScript® code to C/C++ code through a low level virtual machine (LLVM). Therefore, the terminal device (such as the electronic device with iOs®, Windows®, or Android® system) can execute the C/C++ code to display the dynamic or interactive web page. However, when the received JavaScript® code does not exist in codebase of the pre-defined file, named as "ASM.js", the received JavaScript® code cannot be converted to the C/C++ code. That is, the optimization solution for JavaScript® provided by Mozilla® lacks of flexibility.

Furthermore, Google® provides a JavaScript® engine, called by V8 engine. Before the JavaScript® code is executed, the V8 engine does not direct compile the JavaScript® code, and does not compile the JavaScript® code to the byte code, but compiles the JavaScript® code to a machine code to increase the performance. However, the V8 engine still cannot avoid the time consumption for loading the JavaScript® code. In addition, the JavaScript® code itself cannot control the release of the memory space, and the memory leak may occur. Thus, the V8 engine is designed to have a garbage collection (GC) function.

The garbage collection is an automatic memory management mechanism. When the data of variables, objects, or strings stored in the dynamic memory is useless, the garbage collection is used to release the memory space occupied by the data. The garbage collection of different strategy can be stop-the-world (STW) garbage collection, concurrent garbage collection, or incremental garbage collection. When the system determines the garbage collection to be executed, the stop-the-world garbage collection stops executing the current program, and begins to execute the garbage collection. The concurrent garbage collection executes the garbage collection without stopping the program execution, but can merely execute the uncomplicated garbage collection by contrast, thus causing poor performance. The incremental garbage collection adopts the stop-the-world garbage collection and the concurrent garbage collection, and determines tradeoff of both of the stop-the-world garbage collection and the concurrent garbage collection. Thus, the incremental garbage collection usually executes uncomplicated garbage collection as the concurrent garbage collection, but when the system determines the complicated garbage collection to be executed, as the stop-the-world garbage collection, the incremental garbage collection stops executing the current program, and begins to execute the complicated garbage collection.

It is known that the stop-the-world garbage collection and the incremental garbage collection cannot be controlled externally, and the concurrent garbage collection may cause the poor performance. V8 engine currently adopts the incremental garbage collection to reduce the impact of the executing program interruption. However, when incremental garbage collection executes stop-the-world garbage collection, incremental garbage collection still cannot be controlled externally, and the executing program still may be stopped at unexpected time, thus causing the poor user experience.

SUMMARY

An exemplary embodiment of the present disclosure provides a hybrid dynamic code compiling device comprising a parser, a native code generator, and a dynamic code rewriter, wherein the parser is coupled to the native code generator and the dynamic code rewriter. The parser is used to receive and parse a first dynamic code to divide the first dynamic code into compilable blocks and non-compilable blocks. The native code generator is used to generate a native code according to the compilable blocks. The dynamic code rewriter rewrites the non-compilable blocks to generate a second dynamic code, wherein the second dynamic code has function calls which communicate between the first dynamic code and the native code.

An exemplary embodiment of the present disclosure provides hybrid dynamic code compiling method, and the hybrid dynamic code compiling method comprises the following steps. At step A, a first dynamic code is received and parsed to divide the first dynamic code into compilable blocks and non-compilable blocks. At step B, a native code is generated according to the compilable blocks. At step C, the non-compilable blocks is rewritten to generate a second dynamic code, wherein the second dynamic code has function calls which communicate between the first dynamic code and the native code.

An exemplary embodiment of the present disclosure provides a service system comprising a computing device, a server, and a terminal device, wherein the server is connected to the computing device, and the terminal device is connected to the server. At least one or combination of the computing device, the server, and the terminal device is used to execute the hybrid dynamic code compiling method mentioned above.

To sum up, the hybrid dynamic code compiling device, method, and the service system thereof provided by the exemplary embodiments of the present disclosure can efficiently increase the dynamic code processing performance of the terminal device.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
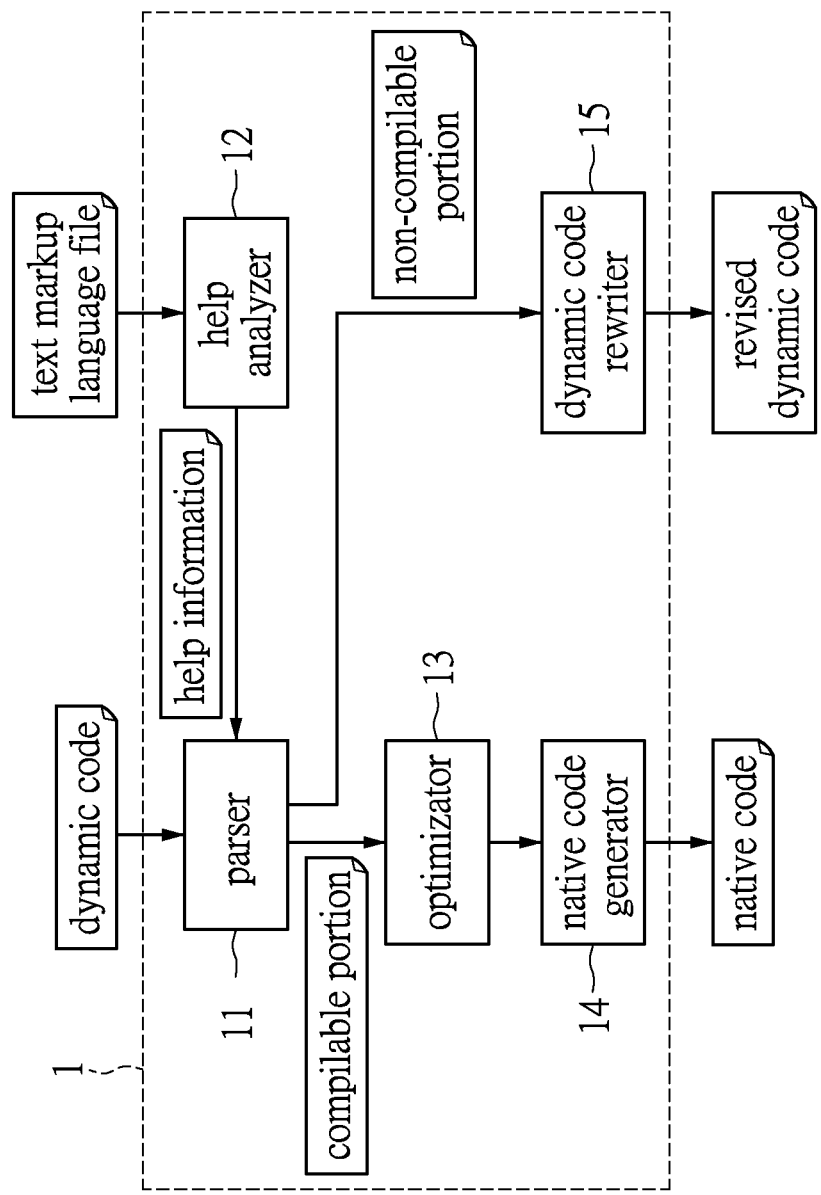
FIG. 1 is a schematic block diagram of a hybrid dynamic code compiling device according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Exemplary embodiments of the present disclosure provide a hybrid dynamic code compiling device and method, and the hybrid dynamic code compiling device and method can be implemented by software or hardware. The hybrid dynamic code compiling device and method receive a dynamic code, such as JavaScript® code, and parse the dynamic code to divide the dynamic code into compilable blocks and non-compilable blocks. Next, the hybrid dynamic code compiling device and method generate a native code according to the compilable blocks, such as C/C++ code or native client application programming interface (API) of JavaScript, and rewrite the non-compilable blocks to generate a revised dynamic code, wherein the revised dynamic code has function calls which communicate between the original dynamic code and the native code.

Next, the terminal device can directly analyze the native code through a browser or other decoding device (such as web page browser for iOs, Windows, or Android system), and then analyze the revised dynamic code through a dynamic code decoding engine of the terminal device. Since the revised dynamic code has the function calls which communicated between the original dynamic code and the native code, after the terminal device analyzes the native code and the revised dynamic code, the terminal device can entirely execute the content of the original dynamic code, so as to display the dynamic or interactive web page corresponding to the original dynamic code.

In addition, the hybrid dynamic code compiling device and method can further analyze the dynamic code, and obtain an annotation of an application programming provided by a system to which the dynamic code corresponds, so as to intercept function calls of garbage collection, and analyze the annotation to generate the native code and the revised dynamic code accordingly. Therefore, the terminal device can release the memory space according to the design of the web page designed. In other words, the hybrid dynamic code compiling device and method can allow the web page designer to add the annotation according to the requirements, so as to accelerate the processing speed of the server by using the annotation, or control the memory space release of the terminal device to prevent the memory leak of the terminal device.

Moreover, an exemplary embodiment of the present disclosure further provides a service system using the mentioned hybrid dynamic code compiling device or method. The mentioned hybrid dynamic code compiling device or method can be implemented by at least one or combination of the computing device, the server, and the terminal device in the service system. Thus, the dynamic code edited by the web page designer is parsed, and compilable portion of the dynamic code (i.e. compilable blocks) is converted to the native code, and the non-compilable portion of the dynamic code (i.e. non-compilable blocks) is rewritten. The terminal device can use the native code and the revised dynamic code to display the dynamic or interactive web page corresponding to the original dynamic code. In other words, processing speed and memory efficiency of the terminal device for displaying the dynamic or interactive web page can be increased.

Referring to FIG. 1, FIG. 1 is a schematic block diagram of a hybrid dynamic code compiling device according to an exemplary embodiment of the present disclosure. The hybrid dynamic code compiling device 1 comprises a parser 11, a help analyzer 12, an optimizer 13, a native code generator 14, and a dynamic code rewriter 15. The parser 11 is coupled to the help analyzer 12, the optimizer 13, and the dynamic code rewriter 15, and the optimizer 13 is coupled to the native code generator 14.

The help analyzer 12 is used to receive a text markup language file, such as HTML file, and analyze the text markup language file to generate help information to the parser 11, wherein the help information is for example interactive information of the dynamic code and web page interface. The parser 11 receives the dynamic code, and parses the dynamic code through the help of the help information, so as to divide the dynamic code into compilable blocks (i.e. the compilable portion of the dynamic code) and non-compilable blocks (i.e. the non-compilable portion of the dynamic code). The optimizer 13 receives the compilable blocks, and optimizes the compilable blocks. The native code generator 14 is used to receive optimized compilable blocks, and convert the optimized compilable blocks to a native code.

Additionally, the dynamic code rewriter 15 rewrites the non-compilable blocks to generate a revised dynamic code, wherein the revised dynamic code has function calls which communicate between the original dynamic code and the native code. Since the revised dynamic code has function calls which communicate between the original dynamic code and the native code, after the terminal device analyzes the native code and the revised dynamic code, the terminal device can entirely execute the content of the original dynamic code, and display the dynamic or interactive web page corresponding to the original dynamic code.

Next, the detail how the parser 11 divides the dynamic code into the compilable blocks and the non-compilable blocks is illustrated as follows. Though the characteristic of the dynamic code (such as JavaScript® code) is significantly different from that of the native code (such as C/C++ code), the syntax structure of the dynamic code is similar to that of the native code. Thus, the parser 11 traverses the abstraction tree (AST), and stores the dynamic code according to the syntax structure (i.e. sorts the syntax structure of the dynamic code), so as to accelerate the compiling process, and extract the structured codes accordingly. Furthermore, since the objects or classes in the dynamic code may be indefinitely declared, i.e. the objects or the classes in the dynamic code may be hidden objects or classes, the parser 11 must analyze batches of information associated with the objects or classes to compare the objects or classes in the dynamic code with those in the native code. In addition to the purpose of the traditional compiling technology, the parser 11 can further records the occurred variables to form the base of the type inference. It is known that, the parser 11 can extract the structured codes, the batches of object or class information, and the batches of variable information from the dynamic code to establish blocks, and portion of the blocks can be the compilable portion of blocks which are converted to the native code.

To put it concretely, the parser 11 checks whether the blocks formed by the structured codes, the batches of object or class information, and the batches of variable information can be the compilable blocks by using an established symbol table. The established symbol table records relation between symbol types and whether the symbol types are compilable. For example, the local variable is recorded to be compilable, the global variable is recorded to be non-compilable, the eval in the built-in variable is recorded to be non-compilable, and other variable in the built-in variable is recorded to be non-compilable or compilable according to the actual implementation. When the block has a global variable or an eval in the built-in variable, the block is determined to be the non-compilable block. By contrast, when the block merely has single one or several local variables, the block is determined be possible compilable block. Next, the parser 11 parser 11 performs a type inference on the possible compilable blocks. When the possible compilable block cannot be inferred, the possible compilable block is determined to be the non-compilable block. When the possible compilable block can be inferred, the possible compilable block is determined to be the compilable block.

Moreover, the hybrid dynamic code compiling device 1 in the exemplary embodiment further allow the web page designer to control the garbage collection, such that a time for the memory space of the terminal device to be released can be controlled according to the requirements of the web page designer, i.e. the hybrid dynamic code compiling device 1 provides an application programming interface to the web page designer, such that the web page designer is allowed to call the system to execute the garbage collection. Thus, through a built in specific function in the parser 11, when the parser 11 parses the dynamic code, the parser 11 can obtain the annotation of the application programming interface provided by the system to which the dynamic code corresponds, and intercept the function calls of the garbage collection, such as the function calls of the stop-the-world garbage collection defined in V8 engine. Then, the parser 11 analyzes the annotation to determine whether the web page designer want to process the garbage collection for the specific object, and generates the native code and the revised dynamic code accordingly, such that the terminal device can execute the garbage collection according to the native code and the revised dynamic code, i.e. the native code and the revised dynamic code, generated further according to the annotation, are used to indicate the terminal device when the memory space to be released according to the annotation. In another implementation, the parser 11 may not intercept the function calls of the stop-the-world garbage collection which the system needs to execute, but just can analyze the annotation to determine whether the web page designer want to process the garbage collection for the specific object so as to generate the native code and the revised code to the terminal device, and then the terminal device can determine when the memory space to be released according to the indications of system and the web page designer. Take V8 engine for example, the front-end parser of V8 engine in the terminal device is correspondingly modified, such that the terminal device can trigger the garbage collection according to the annotation edited by the web page designer after receiving the native code and the revised dynamic code.

In the exemplary embodiment, the help analyzer 12 and the optimizer 13 are not the necessary elements of the hybrid dynamic code compiling device 1. The help analyzer 12 can be removed from the hybrid dynamic code compiling device 1, and the parser 11 can parse the dynamic code without referring the help information generated by the help analyzer 12. The optimizer 13 can be removed from the hybrid dynamic code compiling device 1, and the native code generator 14 can generate the native code directly according to the compilable blocks which are not optimized. In short, whether the hybrid dynamic code compiling device 1 has the help analyzer 12 and/or the optimizer 13 is not used to limit the present disclosure.

It is noted that, the hybrid dynamic code compiling device 1 can be integrated in single one chip by integrated circuit implementation, formed by multiple discrete circuits, or implemented by multiple software code based modules. For example, the hybrid dynamic code compiling device 1 can be a software package implemented by the software provider, or a hardware device sold by the hardware provider, wherein the hardware device can be externally connected to (such as through the universal serial bus) or built in the computing device, server, or the terminal device. To sum up, the detailed implementation of the hybrid dynamic code compiling device 1 is not limit in the present disclosure.

Figure 2A:
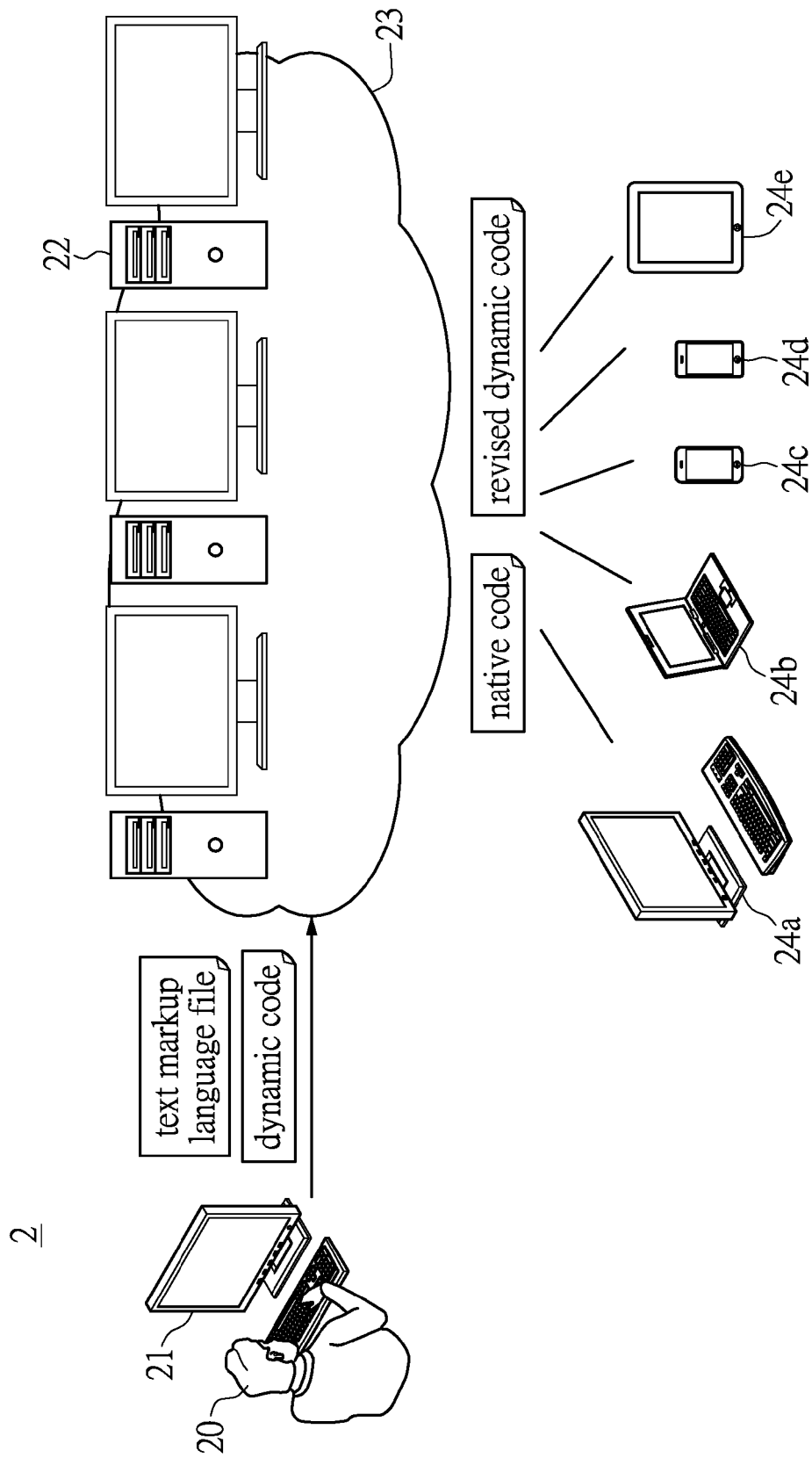
FIG. 2A is a schematic diagram of a service system according to an exemplary embodiment of the present disclosure.

Referring to FIG. 2A, FIG. 2A is a schematic diagram of a service system according to an exemplary embodiment of the present disclosure. The service system 2 comprises a computing device 21, a server 22, an internet 23, and terminal devices 24a through 24e. The computing device 21 is wiredly or wirelessly connected to the server 22 through the internet 23 manner, and the server 22 is wiredly or wirelessly connected to the terminal devices 24a through 24e through the internet 23. The terminal devices 24a through 24e are for example a person computer, a notebook, a smart phone, or a function phone, and the type of the terminal devices 24a through 24e are not used to limit the present disclosure.

In the exemplary embodiment of the present disclosure, the hybrid dynamic code compiling device can be built in or externally connected to the server 22. Thus, the web page designer 20 can use the computing device 21 to edit the text markup language file and the dynamic code, such as the HTML file and the JavaScript® code, and the web page designer 20 uploads the edited text markup language file and the edited dynamic code to the server 22.

The server 22 uses the built in or externally connected hybrid dynamic code compiling device to divide the dynamic code into the compilable portion and the non-compilable portion of the dynamic code, wherein the compilable portion of the dynamic code is converted to the native code, and the non-compilable portion of the dynamic code is rewritten to generate the revised dynamic code, wherein the revised dynamic code has the function calls which communicate between the original dynamic code and the native code.

Then, the server 22 can deliver the native code and the revised dynamic code generate by the hybrid dynamic code compiling device to the terminal devices 24a through 24e via the internet 23, such that the terminal devices 24a through 24e can display the dynamic or interactive web page corresponding to the original dynamic code edited by web page designer 20 according to the native code and the revised dynamic code. Furthermore, the server 22 can also deliver the text markup language file to the terminal devices 24a through 24e via the internet 23.

Figure 2B:
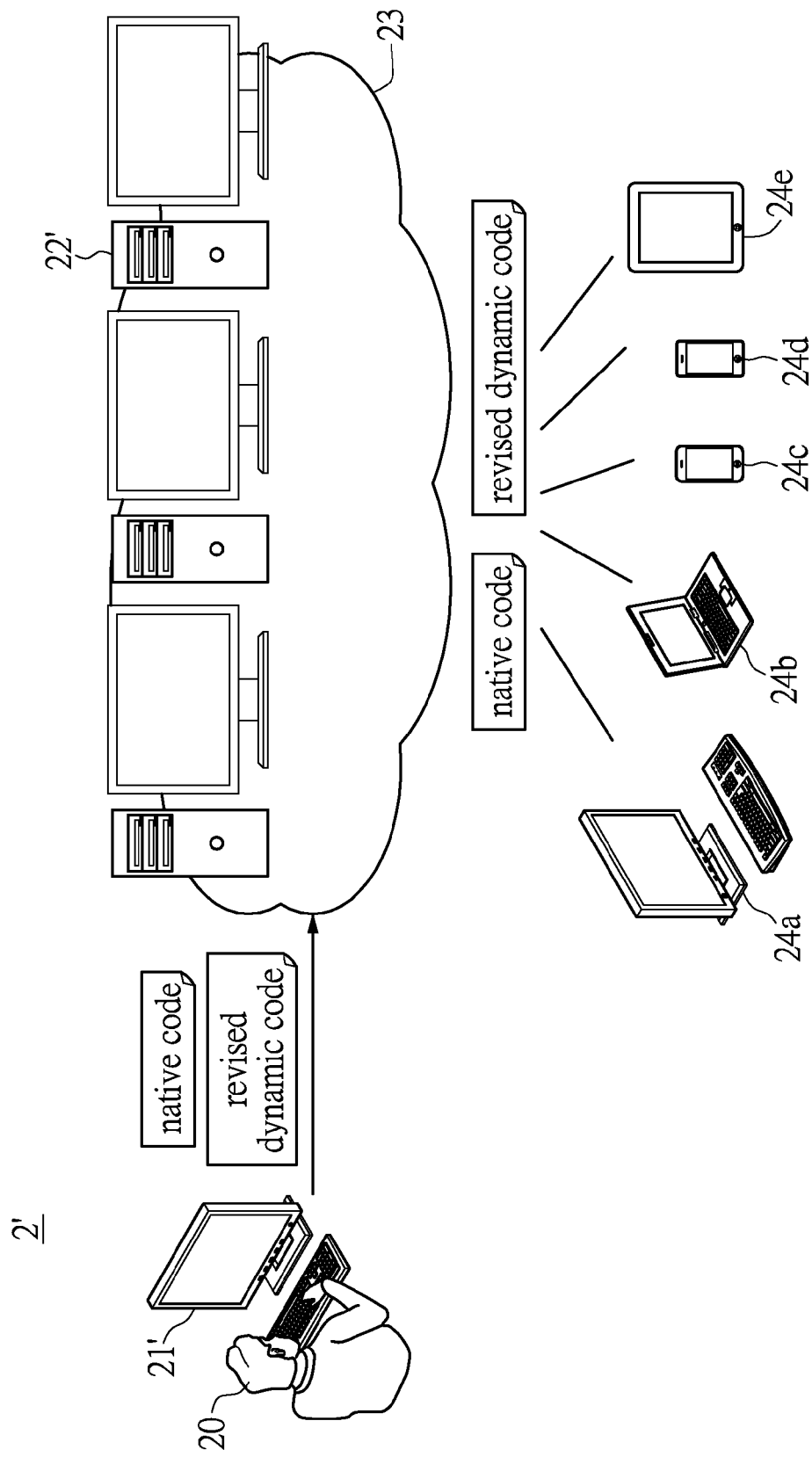
FIG. 2B is a schematic diagram of a service system according to another exemplary embodiment of the present disclosure.

It is noted that, the present disclosure does not limit whether the hybrid dynamic code compiling device is built in or externally connected to the server 22. Referring to FIG. 2B, FIG. 2B is a schematic diagram of a service system according to another exemplary embodiment of the present disclosure. Compared to FIG. 2A, in the exemplary embodiment of FIG. 2B, the hybrid dynamic code compiling device is built in or externally connected to the computing device 21' of the service system 2' rather than the server 22' of the service system 2'. In other word, the computing device 21' directly receives the dynamic code and the text markup language file edited by the web page designer 20, and directly converts the dynamic code to the native code and the revised dynamic code. Then, the computing device 21' transmits the native code and the revised dynamic code to the server 22' via the internet 23, and the terminal device 24a through 24e receives the native code and the revised dynamic code from the server 22' via the internet 23, such that the terminal device 24a through 24e can display the dynamic or interactive web page corresponding to the original dynamic code edited by web page designer 20 according to the native code and the revised dynamic code.

Figure 2C:
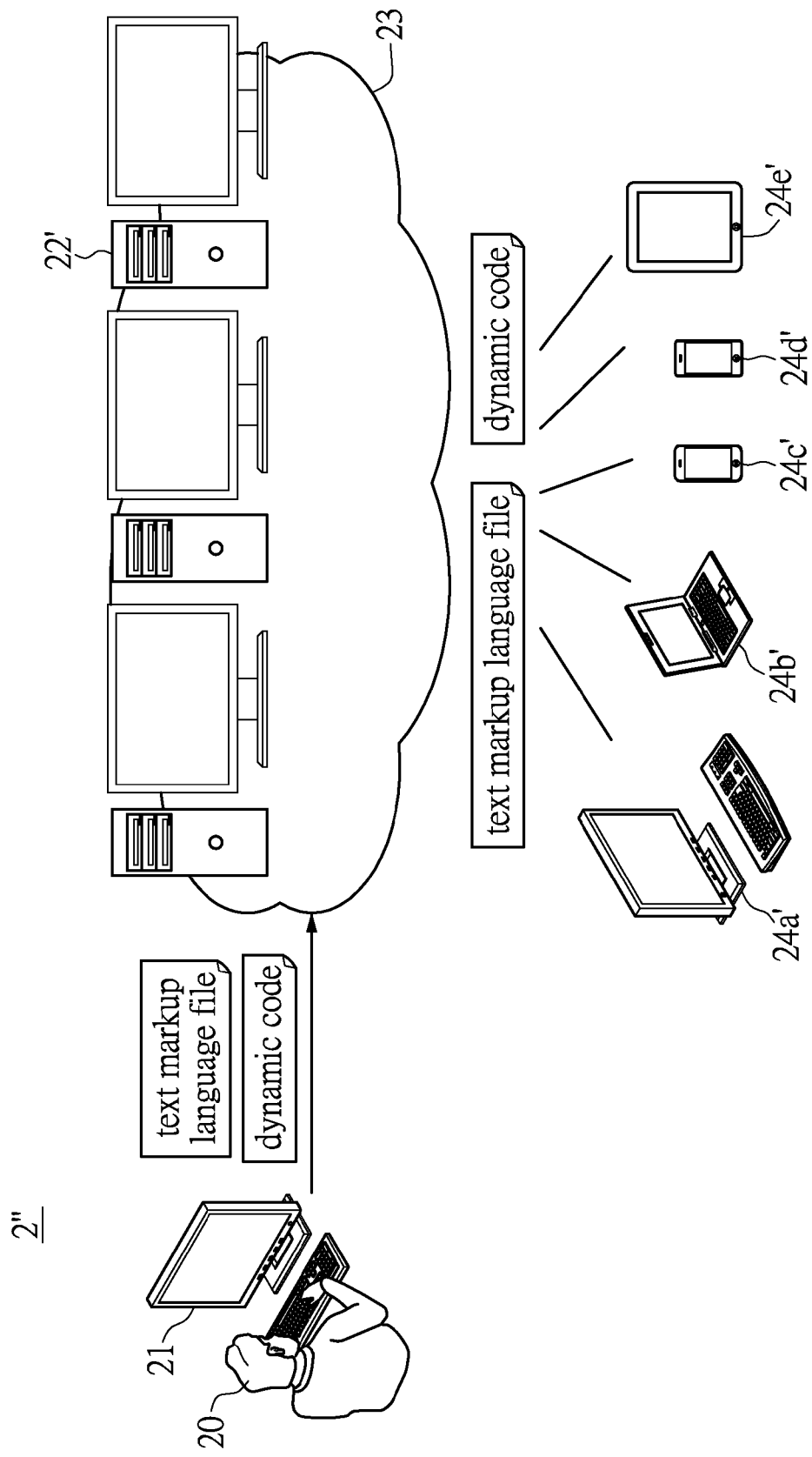
FIG. 2C is a schematic diagram of a service system according to another exemplary embodiment of the present disclosure.

Referring to FIG. 2C, FIG. 2C is a schematic diagram of a service system according to another exemplary embodiment of the present disclosure. Compared to FIG. 2A, in the exemplary embodiment of FIG. 2C, the hybrid dynamic code compiling device is built in or externally connected to each of the terminal devices 24a' through 24e' of the service system 2' rather than the server 22' of the service system 2'. The web page designer 20 uses the computing device 21 transmits the edited text markup language file and the edited dynamic code to the terminal devices 24a' through 24e' via the server 22' and the internet 23. The hybrid dynamic code compiling device built in or externally connected to each of the terminal devices 24a' through 24e' can convert the dynamic code to the native code and the revised dynamic code. Next, the terminal device 24a through 24e can display the dynamic or interactive web page corresponding to the original dynamic code edited by web page designer 20 according to the native code and the revised dynamic code.

Though the above exemplary embodiments illustrate the hybrid dynamic code compiling device is built in or externally connected to the computing device, the server, or the terminal device, the present disclosure is not limited thereto. It is noted that, considering the computing abilities of the apparatuses are not identical to each other, each elements of the hybrid dynamic code compiling device can discretely implemented in at least two of the computing device, the server, and the terminal device, so as to discretely process the dynamic code. In addition, the hybrid dynamic code compiling devices can be built in or externally connected to the computing device, the server, and the terminal device, and each of the hybrid dynamic code compiling devices can be communicated with each other, and the partial dynamic code can be processed to generate the partial native code and partial revised dynamic code.

Figure 3:
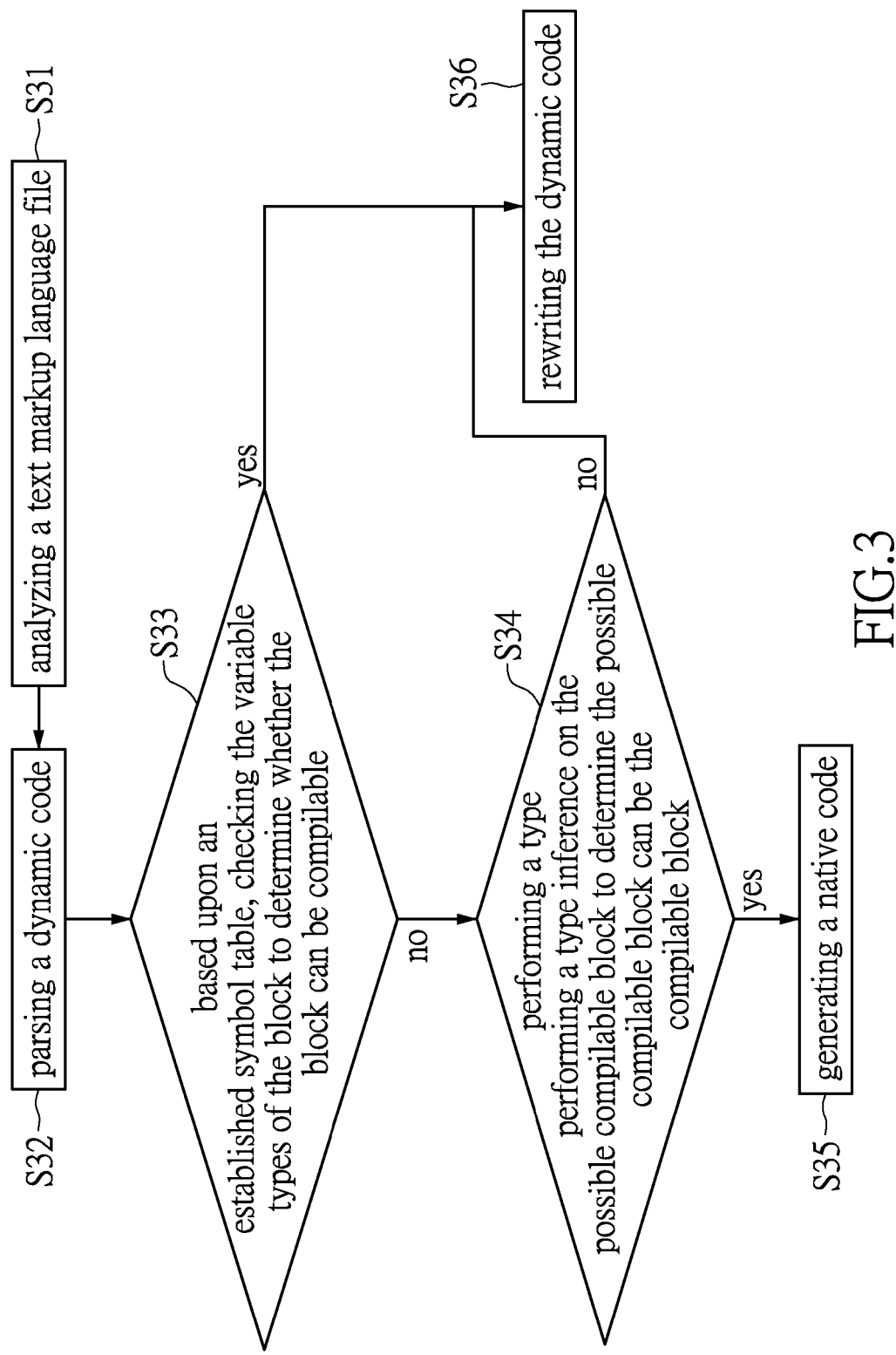
FIG. 3 is a schematic flow chart of a hybrid dynamic code compiling method according to an exemplary embodiment of the present disclosure.

Referring to FIG. 3, FIG. 3 is a schematic flow chart of a hybrid dynamic code compiling method according to an exemplary embodiment of the present disclosure. The hybrid dynamic code compiling method in FIG. 3 can be executed in the electronic device having the computing ability, and can be executed by the mentioned hybrid dynamic code compiling device. In short, the apparatus for executing the hybrid dynamic code compiling method is not used to limit the present disclosure.

Firstly, at step S31, a text markup language file is received and analyzed to generate help information. Then, at step S32, a dynamic code is received and parsed to divide into blocks, wherein the help information is optionally inferred to help to parse the dynamic code, the dynamic code may be embedded in the text markup language file, and the dynamic code is extracted though the analysis of the text markup language file, or alternatively, the dynamic code is a file independent to the text markup language file. Additionally, the dynamic code has structured code, batches of object or class information, and batches of variable information which are used to form the mentioned blocks.

Next, at step S33, for each block, based upon an established symbol table, the variable types of the block are checked, so as to determine whether the block can be compilable. For example, when the block has the global variable or the eval in the built-in variable, the block is determined to be the non-compilable block, and then step S36 is executed. By contrast, when the block merely has the single one or several local variables, the block is determined to be the possible compilable block, and step S34 is then executed.

Next, at step S34, for each possible compilable block, a type inference is performed on the possible compilable block to determine the possible compilable block can be the compilable block. When a type of the possible compilable block is able to be inferred, the possible compilable blocks is determined to be the compilable blocks, and then step S36 is executed. When the type of the possible compilable block is not able to be inferred, the possible compilable block is determined to be the non-compilable block, and step S35 is then executed.

Next, at step S35, a native code is generated according to the compilable blocks, i.e. the compilable blocks are converted to the native code. Additionally, at step S36, the non-compilable blocks are rewritten to generate the revised dynamic code, wherein the revised dynamic code has function calls which communicate between the original dynamic code and the native code. The terminal device receives the native code and the revised dynamic code, and entirely executes the content of the original dynamic code to display the dynamic or interactive web page corresponding to the original dynamic code.

Figure 4:
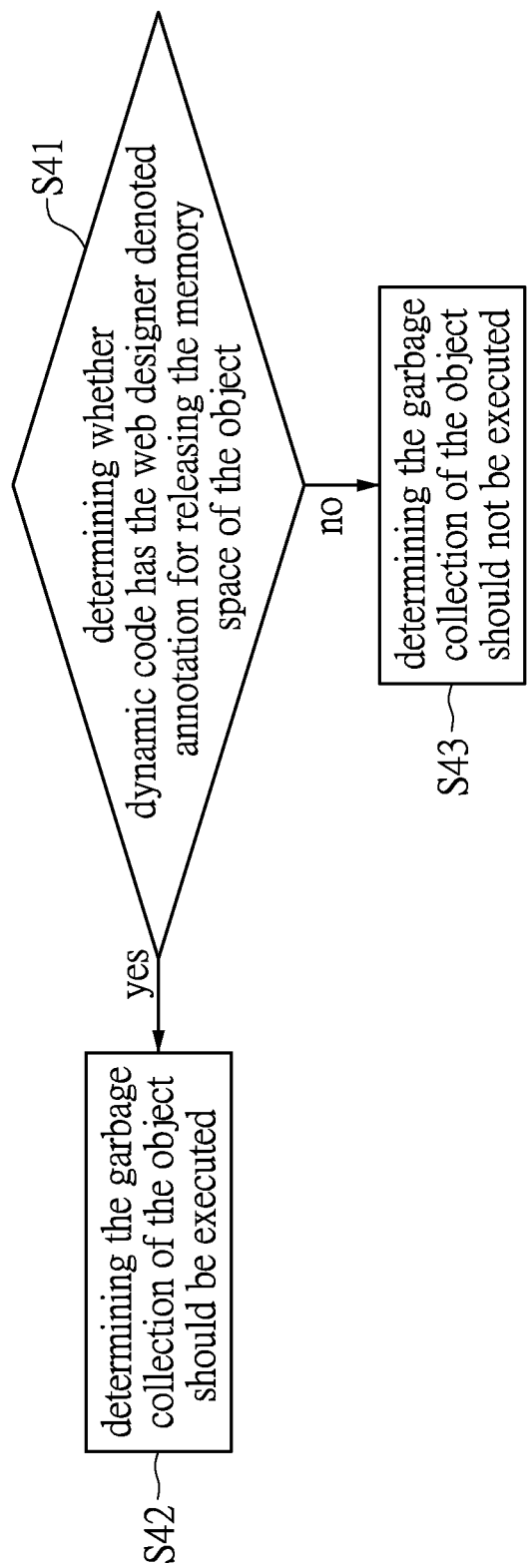
FIG. 4 is a schematic flow chart of garbage collection in a hybrid dynamic code compiling method according to an exemplary embodiment of the present disclosure.

Referring to FIG. 4, FIG. 4 is a schematic flow chart of garbage collection in a hybrid dynamic code compiling method according to an exemplary embodiment of the present disclosure. As mentioned above, the hybrid dynamic code compiling method can also allow the web page designer to control the garbage collection. Steps S41 through S43 in FIG. 4 can be executed at step S31 of FIG. 3, and whether step S31 comprises steps S41 through S43 in FIG. 4 is not used to limit the present disclosure, i.e. whether the hybrid dynamic code compiling method allows the web page designer to control the garbage collection is not used to limit the present disclosure. When the hybrid dynamic code compiling method allows the web page designer to control the garbage collection, the hybrid dynamic code compiling method obtains the annotation of the application programming interface provided by the system to which the dynamic code corresponds, so as to intercept function calls of the garbage collection.

At step S41, whether dynamic code has the web designer denoted annotation for releasing the memory space of the object is determined. When that the dynamic code has the annotation for releasing the memory space of the object is determined, step S42 is then executed. When that the dynamic code does not have the annotation for releasing the memory space of the object is determined, step S43 is then executed. At step S42, that the garbage collection of the object to be executed is determined, and the annotation for executing the garbage collection of the object is generated in the corresponding block. At step S43, that the garbage collection of the object to not be executed is determined, and the annotation for not executing the garbage collection of the object is generated in the corresponding block. Thus, the terminal device can determines whether the garbage collection of the object to be executed according to the annotation in the block, so as to meet the memory space control manner expected by the web page designer. Accordingly, the execution performance of the terminal device is increased, and the memory leak is prevented.

It is noted that, in the exemplary embodiment of FIG. 4, the hybrid dynamic code compiling method intercepts function calls of the garbage collection. However, an exemplary embodiment of the present disclosure may selectively intercept the function calls of the garbage collection associated with the persistent objects. In other word, the function calls of the garbage collection of the local objects are controlled by the system. The function calls of the garbage collection of the persistent objects can be merely intercepted, and the execution of the garbage collection for releasing the memory space of the persistent object of the persistent object may be determined according to the annotation, denoted by the web page designer.

Take V8 engine for example, in V8 engine, the object reference is managed by Handle function module. Handle function module comprises object pointers to indicate the object location addresses. Handle function module divide the objects into persistent objects and local objects. In the exemplary embodiment of the present disclosure, V8 engine is modified, such that the hybrid dynamic code compiling method control the release of the memory space of the persistent object. In other word, when the live range of the local object exceeds the scope of defined HandleScope, the garbage collection of the local object is executed automatically by the system. The garbage collection of the persistent object is not only controlled by the system originally, but also is executed now according to the web page designer denoted annotation for releasing the memory space of the persistent object. In addition, it is noted that, V8 engine can be modified as that the garbage collection of the persistent object is merely executed according to the web page designer denoted annotation for releasing the memory space of the persistent object. Alternatively, V8 engine can be modified as that the garbage collection of the persistent object is executed simultaneously according to the system control and the web page designer denoted annotation for releasing the memory space of the persistent object.

To sum up, according to the hybrid dynamic code compiling device, method, and the service system thereof, provided by exemplary embodiments of the present disclosure, the performance of the terminal device for processing the dynamic code can be efficiently improved, and the garbage collection may be efficiently executed to prevent the memory leak in the terminal device with the annotation denoted by the web page designer. In addition, the hybrid dynamic code compiling device may be implemented by a hardware or software manner, and the complexity thereof is not high, such that the cost is not expensive.

It is preferred that, in the exemplary embodiment of the present disclosure, the hybrid dynamic code compiling device can be installed in the server of the service system, such that a large number of computing amounts of the computing device may be prevented while the dynamic code is converted and compiled. Moreover, based on the above configuration, the service provided from the server service provider may allow the web page designer to convert the dynamic code to the native code and the revised dynamic code.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A hybrid dynamic code compiling method, comprising:
   step A: receiving and parsing a first dynamic code to divide the first dynamic code into compilable blocks and non-compilable blocks;
   step B: generating a native code according to the compilable blocks; and
   step C: revising the non-compilable blocks to generate a second dynamic code, wherein the second dynamic code has function calls which communicate between the first dynamic code and the native code;
   wherein at the step A, extracting structured codes, batches of object or class information, and batches of variable information from the first dynamic code to generate blocks, dividing the blocks into the compilable blocks and the non-compilable blocks, and determining whether each of the blocks is a possible compilable block based on an established symbol table, and then performing a type inference on each of the possible compilable blocks to determine whether each of the possible compilable blocks is the compilable block.

2. The hybrid dynamic code compiling method according to claim 1, wherein at the step A, when the block has a global variable or an eval of a built-in variable, determining the block is the non-compilable block; when the block merely has single one or multiple local variables, determining the block is the possible compilable block.

3. The hybrid dynamic code compiling method according to claim 1, wherein at the step A, when a type of the possible compilable block is able to be inferred, determining the possible compilable blocks is the compilable blocks; when the type of the possible compilable block is not able to be inferred, determining the possible compilable block is the non-compilable block.

4. The hybrid dynamic code compiling method according to claim 1, wherein at the step A, when the first dynamic code is parsed, obtaining an annotation of an application programming interface associated with a system to which the first dynamic code corresponds, wherein the native code and the second dynamic code generated further according to the annotation indicate when a memory space of a terminal device to be released according to the annotation.

5. The hybrid dynamic code compiling method according to claim 4, wherein at the step A, further intercepting function calls of garbage collections associated with persistent objects, processing the function calls of the garbage collections with persistent objects, and generating the native code and the second dynamic code further according to the annotation, such that the native code and the second dynamic code indicate when the memory space of the terminal device to be released according to the annotation.

6. The hybrid dynamic code compiling method according to claim 1, further comprising:
   step D: optimizing the compilable blocks, wherein the native code is generated according to optimized compilable blocks.

7. The hybrid dynamic code compiling method according to claim 1, further comprising:
   step E: receiving and analyzing a hyper text markup language file to generate help information, such that the first dynamic code is parsed through help of the help information.

8. A service system, comprising:
   a computing device;
   a server, connected to the computing device; and
   a terminal device, connected to the server;
   wherein at least one or combination of the computing device, the server, and the terminal device is used to execute:
   step A: receiving and parsing a first dynamic code to divide the first dynamic code into compilable blocks and non-compilable blocks;
   step B: generating a native code according to the compilable blocks; and
   step C: revising the non-compilable blocks to generate a second dynamic code, wherein the second dynamic code has function calls which communicate between the first dynamic code and the native code;
   wherein at the step A, a parser of at least one or combination of the computing device, the server, and the terminal device extracts structured codes, batches of object or class information, and batches of variable information from the first dynamic code to generate blocks, divides the blocks into the compilable blocks and the non-compilable blocks, determines whether each of the blocks is a possible compilable block based on an established symbol table, and performs a type inference on each of the possible compilable blocks to determine whether each of the possible compilable blocks is the compilable block.

9. The service system according to claim 8, wherein at the step A, when the first dynamic code is parsed, obtaining an annotation of an application programming interface associated with a system to which the first dynamic code corresponds, wherein the native code and the second dynamic code generated further according to the annotation indicate when a memory space of the terminal device to be released according to the annotation.

10. The service system according to claim 8, wherein when the block has a global variable or an eval of a built-in variable, the parser determines the block is the non-compilable block; when the block merely has single one or multiple local variables, the parser determines the block is the possible compilable block.

11. The service system according to claim 8, wherein when a type of the possible compilable block is able to be inferred, the parser determines the possible compilable blocks is the compilable blocks; when the type of the possible compilable block is not able to be inferred, the parser determines the possible compilable block is the non-compilable block.

12. The service system according to claim 9, wherein the parser further intercepts function calls of garbage collections associated with persistent objects, processes the function calls of the garbage collections with persistent objects, and generates the native code and the second dynamic code further according to the annotation, wherein the native code and the second dynamic code indicate when the memory space of the terminal device to be released according to the annotation.

13. The service system according to claim 8, wherein at least one or combination of the computing device, the server, and the terminal device further comprises:
   an optimizer, coupled between the parser and the native code generator, used to optimize the compilable blocks, and the native code generator generates the native code according to optimized compilable blocks.

14. The service system according to claim 8, wherein at least one or combination of the computing device, the server, and the terminal device further comprises:
   a help analyzer, coupled to the parser, used to receive and analyze a hyper text mark language file to generate help information, such that the parser parses the first dynamic code through help of the help information.

* * * * *